UNITED STATES PATENT OFFICE

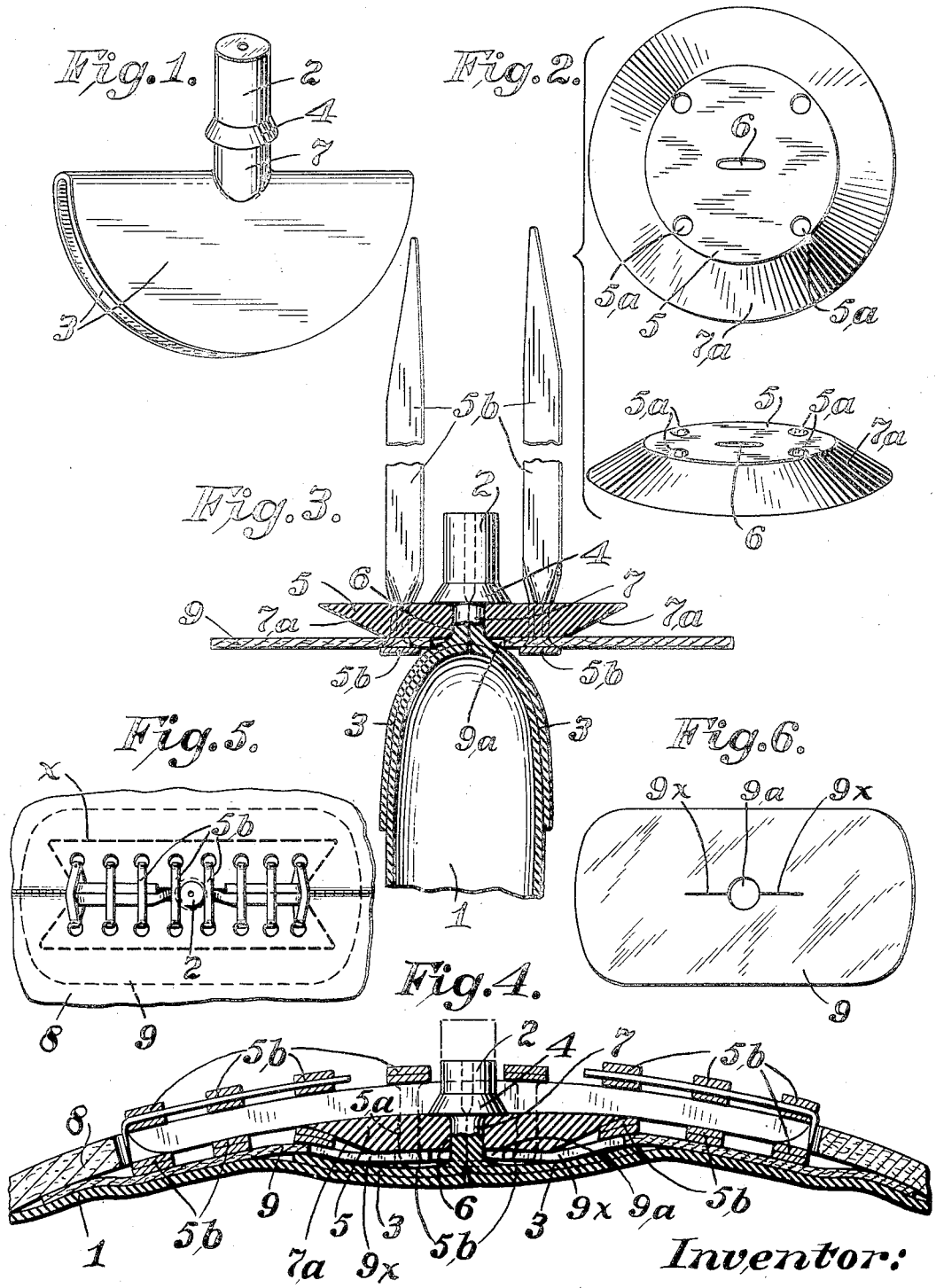

OSWALD A. SAVARIA, OF CHICOPEE, MASSACHUSETTS, ASSIGNOR TO A. G. SPALDING & BROS., OF NEW YORK, N. Y., A CORPORATION OF NEW JERSEY

VALVE ORGANIZATION FOR PLAYING BALLS AND THE LIKE

Application filed July 17, 1931. Serial No. 551,477.

It is an object of the invention to provide an all rubber valve assembly for an inflatable playing ball, which assembly provides a secure closure against the escape of air from the bladder and which also provides for the ready inflation of the ball.

The invention consists in the features and combination and arrangement of parts hereinafter described and particularly pointed out in the claims.

In the accompanying drawing

Figure 1 is a view of the filling tube and valve member together with the rubber flaps by which the tube may be attached to the outer side of the rubber bladder.

Figure 2 shows a perspective view and a plan view of the rubber disc for constricting the filling tube for making said tube serve as the valve for preventing escape of air from the inflated bladder.

Figure 3 is a sectional view showing the valve assembly, a part of the bladder being shown in section.

Figure 4 is a sectional view of the outer casing with the valve assembly combined therewith, a portion of the inflated bladder being shown, this view being in a plane a quarter turn from Fig. 3.

Figure 5 is an outside view of a portion of the ball showing the lacing.

Figure 6 is a detail plan of the leather flap member.

In the drawing, 1 is a rubber bladder having a combined filling tube and valve member 2 attached thereto by the flaps 3 which may be vulcanized to the exterior of the bladder. This rubber filling tube has an enlargement 4 intermediate of its length and spaced apart from the flaps or disc portion 3. Between this enlargement 4 and the bladder is located a rubber disc 5. This is provided with a narrow slit 6 through which extends the neck portion 7 of the filling tube which is constricted by this comparatively thick rubber disc to such a degree that its opposing wall portions are pressed tightly together to form a valve which will prevent the escape of air from the bladder once it is inflated. It will be noticed that the slot 6 amounts practically to a slit in the thick rubber disc and a firm closure is thus afforded by the resilient opposing wall portions of this disc exerting pressure upon the neck of the filling tube.

The thick rubber disc is of considerably larger diameter than the diameter of the filling tube and this presents a mass of rubber at opposite sides of the tube which will securely hold said tube in its contracted condition to act as a valve closed against an escape of air from the bladder. This constricting disc is preferably circular in form and its edge is beveled as at 7a. Its base face, which is of considerable area bears against the inner face of the casing or outer cover of leather shown at 8. A leather guard or flap is shown at 9 located between the inner small area face of the thick rubber disc and the bladder.

It will be observed that the filling tube which also provides the valve, does not extend below the inner surface of the bladder and it extends but a relatively short distance above the outer surface. This makes it possible to assemble the rubber bladder within the case without having the valve extending beyond the outer surface of the leather case. By reason of the construction disclosed, the ball readily may be inflated and deflated. The rubber collar or disc 5 performs a twofold function in that besides acting as a means for holding the valve closed it also is the member by which the assembly shown in Fig. 3 is held in proper position in the casing. For this purpose the said collar or disc is provided with a series of perforations 5a which receive the laces 5b, which laces are passed through the openings in the outer casing and across the main opening in the outer casing to hold same closed. These lacing members also pass through the leather guard or flap which is carried on the tubular valve member between the resilient collar 5 and the rubber bladder. The main purpose of this leather guard is to serve as means of protection for the bladder against being damaged by the lacing needle when lacing the ball. The bevelled edge of the resilient collar avoids the presence of sharp shoulders and the pressure exerted on the edge of this resilient collar or disc aids in holding the valve closed.

It will be noticed that the valve is of such construction that the tube does not have to be bent or tucked into place between any of the parts. All the structure above described is external to the bladder which has but a small opening therein.

By the use of the all-rubber or flexible construction, injury to the players is avoided and true rebound of the ball is secured because of the absence of metal parts.

For filling the bladder a tube or nozzle is thrust through the valve tube 2.

The stitching shown at $x$, Fig. 5, is for appearance sake only, it is not employed for uniting the flap 9 to the outer casing.

The flap or guard 9 has an opening 9a somewhat larger than the diameter of tube 2 and it has slits 9x extending from the opening 9a.

I claim:

1. An inflatable playing ball having a casing, an inflatable bladder within the same, having a tube attached exterior thereto communicating with the interior of the bladder, said tube having an enlargement, a rubber member of disc form of larger diameter than the enlargement, located between said enlargement and bladder fitting flatwise over the latter and completely surrounding, contacting with and normally constricting said tube so that its opposite wall portions are in contact to close the tube against the escape of air from the bladder, said rubber disc being flexible in a direction radially of the bladder, substantially as described.

2. An inflatable playing ball having a casing, an inflatable bladder within the same, a tube on the exterior of said bladder extending through an opening in the casing, and a resilient rubber member of disc form arranged flatwise between said casing and bladder and on and directly contacting said tube completely surrounding and constricting the same to prevent the escape of air from the bladder, but allowing the inflating of said bladder, said rubber disc being flexible in a direction radially of the bladder, substantially as described.

3. A playing ball according to claim 2 in which said rubber member is in the form of a disc with its edge bevelled and with its larger area face bearing on the casing, substantially as described.

4. A playing ball according to claim 2 in which the rubber member extends across the opening in the casing and carries the lacing means, substantially as described.

5. A playing ball according to claim 2 in which the rubber member is combined with a flap or guard of flexible material to lie against the inner side of the casing, and lacing means passing through the guard and rubber member and through the casing to close the opening therein, substantially as described.

6. In combination, a bladder having a tube extending outwardly therefrom and a collar carried by said tube constricting the same to retain air in the bladder and means carried by the collar by which the parts are secured to the outer casing.

7. In combination, a bladder having a tube extending outwardly therefrom, a collar of resilient rubber carried by the tube for constricting the same to retain air in the bladder, said collar being flexible in a direction radially of the bladder, a flexible guard surrounding the tube and adapted to lie against the inner side of the casing, and lacing means for holding said parts to the casing, said collar being of substantially circular form, the axis of which coincides with the axis of the tube, substantially as described.

8. A playing ball according to claim 2 in which said rubber disc has a slit therein through which the tube extends to be constricted by the walls of said slit into closed condition, said disc confining said tube at all points of contact between the two, around the entire periphery of the tube.

9. An inflatable ball having a cover formed with an opening, a bladder having an inflating neck, a rubber washer connected to the inside of the cover and formed with an aperture in register with said opening, said neck passing through said aperture and said aperture being smaller than said neck whereby the passage through the neck is closed by constriction from the wall of said aperture.

10. In combination, a bladder having a tube extending outwardly therefrom and a collar carried by said tube constricting the same to retain air in the bladder, and means extending through the collar by which the parts are connected with the outer casing.

In testimony whereof, I affix my signature.

OSWALD A. SAVARIA.